United States Patent [19]
Niklas et al.

[11] 3,836,401
[45] Sept. 17, 1974

[54] LEAD ACCUMULATOR CONSTRUCTION

[75] Inventors: Hans Niklas, Eppstein; Wolfgang Knabenbauer, Kelkheim; Heinrich Rabenstein, Frankfurt-Zeilsheim, all of Germany

[73] Assignee: Varta Aktiengesellschaft, Frankfurt-Main, Germany

[22] Filed: Aug. 25, 1972

[21] Appl. No.: 283,709

[30] Foreign Application Priority Data
Aug. 26, 1971  Germany............................ 2142768

[52] U.S. Cl. ............................ 136/134 R, 136/170
[51] Int. Cl. ............................................. H01m 1/02
[58] Field of Search.................... 136/134, 145, 170

[56] References Cited
UNITED STATES PATENTS

| | | | |
|---|---|---|---|
| 1,907,420 | 5/1933 | Finn................................ | 136/134 R |
| 2,620,370 | 12/1952 | Chapman........................ | 136/134 R |
| 2,653,985 | 9/1953 | Philipps.............................. | 136/145 |
| 3,396,056 | 8/1968 | Gonnard........................ | 136/134 R |
| 3,494,798 | 2/1970 | Teeter et al..................... | 136/134 R |

FOREIGN PATENTS OR APPLICATIONS
1,229,013  9/1960  France................................ 136/170

*Primary Examiner*—Donald L. Walton
*Attorney, Agent, or Firm*—Herbert L. Lerner

[57] ABSTRACT

A lead accumulator or battery consists of a plurality of cells each having positive and negative plates. A cover provided for each of the cells has openings therein and cell connectors electrically and mechanically interconnect the cells. The cell connectors are disposed below the upper edge of the cell covers and provide a rigid interconnection between the cells. The disposition of the cell connectors below the upper edge of the cell cover protects against inadvertent short circuiting caused by contact with metal objects.

8 Claims, 6 Drawing Figures

PATENTED SEP 17 1974  3,836,401

LEAD ACCUMULATOR CONSTRUCTION

The invention relates to a lead accumulator or storage battery and to structural features thereof. More particularly, the invention relates to a lead accumulator of preferably gas-tight construction.

Lead accumulators of the type having plate lugs electrically connected to all of the cells below a common cell cover are known. In these known accumulators, the plate lugs are soldered to pole bridges and pole bolts are connected by soldered-on cell connectors. In other known batteries, the plate lugs of each cell are led through each individual cell cover and connected to form a battery by means of pole bridges and cell connectors soldered above the cell cover.

In these known devices, the soldering processes and requirements are very cumbersome and can only be done manually. As a result, construction costs are high, particularly as regards labor requirements, because the required soldering has to be done slowly and carefully to avoid excess heat when synthetic covers are being used. In addition, when the cell connections are made above the cell covers, the pole bridges and cell connectors are exposed and are not protected against short circuits caused by possible contact with metal objects. Such batteries which are comprised of a plurality of inter-coupled cells must also be accommodated in special support casings or the like, since a rigid battery connection is not provided by the cell connectors which connect the cells.

It is an object of the present invention to provide a lead accumulator which overcomes the above-mentioned disadvantages of prior art devices and which provides a rigid battery connection through the use of relatively simple coupling means comprising cell connectors and wherein the cells are easy to mount and repair.

To this end and in accordance with the present invention, a plate lug or cell connector is led through an appropriate opening in the side of a cell cover and the cell connectors of the same polarity are electrically connected within the cover. The cells are electrically and mechanically inter-coupled with each other through the cell connectors with the cell connectors being disposed below the upper edge of the cell covers.

Other features which are considered as characteristic of the invention are set forth in the appended claims.

Although the invention is illustrated and described in particular examples of lead accumulators, it is nevertheless not intended to be limited to the details shown, since various modifications and structural changes may be made therein without departing from the spirit of the invention and within the scope and range of equivalents of the claims.

The construction and operation of the invention, however, together with additional features and advantages thereof will best be understood from the following description of specific embodiments when read in connection with the accompanying drawing, in which.

Figure 1:
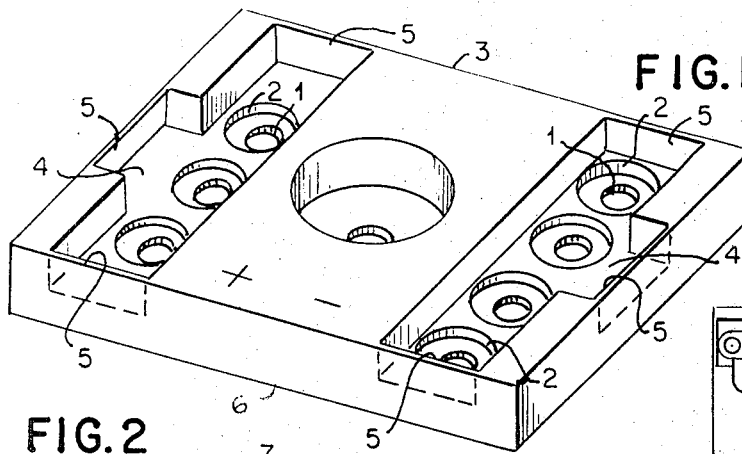
FIG. 1 is a perspective view of a cell cover according to one embodiment of the invention.
Figure 2:
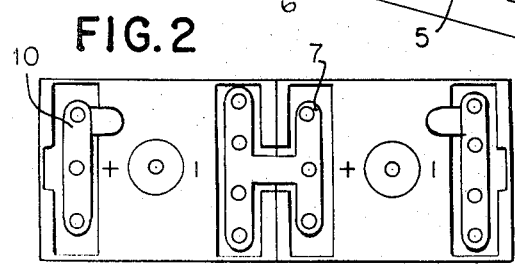
FIG. 2 is a plan view of two cells, each of the type shown in FIG. 1, connected by an H-shaped cell connector.
Figure 3:
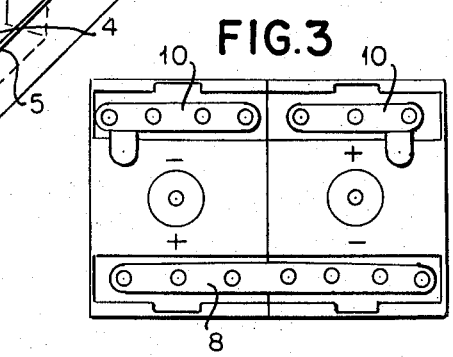
FIG. 3 is a plan view similar to FIG. 2 but with the cells connected by a straight line connector.
Figure 4:
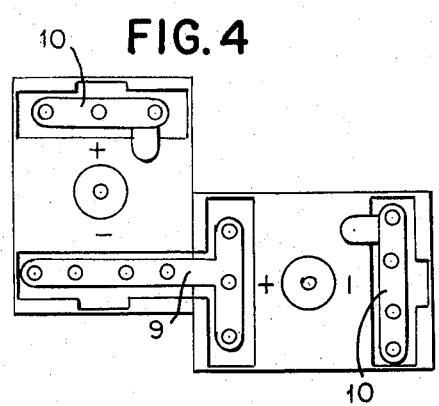
FIGS. 4 – 6 are plan views similar to FIGS. 2 and 3 showing various other combinations of cell arrangements.
Figure 5:
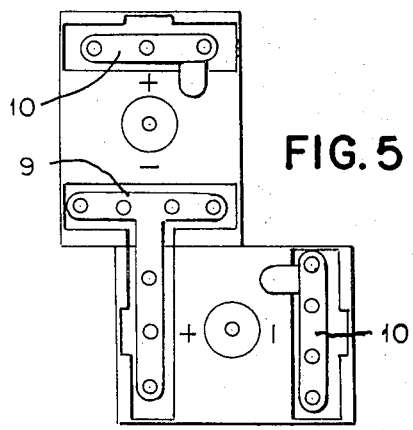
Figure 6:
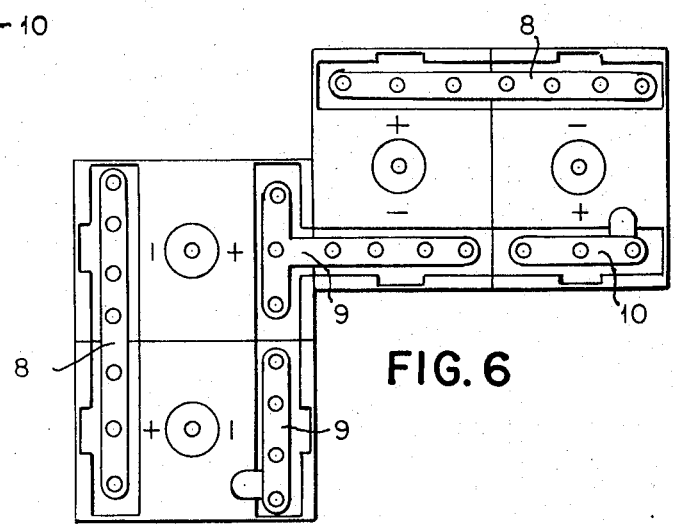

Referring to the drawing, FIG. 1 shows a cell cover according to the embodiment of the present invention. The cell cover includes a row of openings 1 on opposite sides thereof. The lower edges of the openings 1 are flush with the lower edge 6 of the cell cover. The upper end positions of the openings 1 are enlarged and freely accessible. The upper edges 2 of the enlarged upper end portions of the openings 1 lie within the cell cover.

The number of openings 1 used in cell cover may vary and corresponds to the number and arrangement of the connectors. FIGS. 1 – 6, for example, show cell covers having three openings for three positive poles which may be connected to the cell connectors and four openings for four negative poles which may be connected to the cell connectors. Cell connectors 7, 8, 9 electrically and mechanically interconnect the cells. Also, the cell connections 7, 8, 9 and conductors 10 electrically connect the poles on the cells in various configurations, as shown in the drawing.

The upper edge 2 of the openings 1 in the cell cover are disposed on a freely accessible plane or surface 4 which is located below the upper edge 3 of the cover. The height or level of the surface 4 measured from the lower edge 6 of the cell cover is preferably such that the cell connectors 7, 8, 9 and the conductor 10 which are disposed on the surface 4 are still located below the upper edge 3 of the cover. As a result, the current-conducting cell connectors 7, 8, 9 and conductors 10 are not exposed, thereby reducing the possibility of inadvertently causing a short circuit by contacts with a metal object or the like. For further protection, the cell connectors 7, 8, 9 and the conductors 10 may be covered with a mass of synthetic insulating material.

The freely-accessible surfaces 4 of the cell covers are bounded by thin walls 5 which are designed to be broken away or otherwise removed from the cell cover. The thin walls 5 are situated on one or more sides of the cell covers. Depending on the connecting or switching requirements, that is, whether a series or parallel connection is to be made, and according to the selectable spaced arrangement of the cells relative to each other, the walls 5 are so broken off to meet the desired requirements. Thereafter, the cell connectors 7, 8, 9 may be installed on the poles to be connected on the poles and on the surfaces 4 in form-locking relationship. It will be seen, therefore, that in a very simple manner, shown in FIGS. 2 – 6, any desired spacial arrangement or configuration of the cells may be attained in forming a rigid battery connection. Moreover, the selective use of the straight line connector 8, the H-shaped connector 7, and T-shaped connector 9 permits electrically-variable connections or switching of the cell within the battery formation according to the voltage and capacitance requirements which are placed upon the battery.

It will be observed that the cell connectors of the preset invention serve as pole bridges. Another advantage of the cell connectors of the present invention is that they may be easily assembled and mounted and, in addition, they result in a savings in weight and material.

Also, the mounting and assembly may be further facilitated through the use of an appropriate separation.

According to another aspect of the invention, a double-layer separator may be used whereby the negative electrode is provided with an approximately 0.2 mm thick layer of polypropylene fleece disposed around the lower end of the electrode. In addition, an approximately 1.7 mm thick synthetic felt layer of polyester and polypropylene or a mixture of both these materials may also be used. The porosity of the fleece may be about 60 percent and that of the felt about 90 percent. For better fixing and storing of the electrolyte, the space between the plate set and the cell cover may also be provided with an approximately 11 mm thick layer of polyester or propylene felt.

While the invention has been described by means of specific examples, the invention is not intended to be limited thereto for various modifications will occur to those skilled in the art according to the spirit and scope of the invention.

What is claimed is:

1. A lead accumulator comprising a plurality of cells each having positive and negative plates, a cover for each of said cells, said cover having openings, and cell connectors electrically and mechanically connecting said cells, said cell connectors being disposed below the upper edge of said cell covers and providing a rigid, interconnection between said cells, said cell cover having a wall having a bottom surface and bounded by one or more side walls, portions of said side walls being selectively removable, said cell connectors being disposed on said bottom surface below the upper edge of said side walls and passing through openings left by said removed side wall portions to mechanically and electrically interconnect an adjacent cell.

2. A lead accumulator according to claim 1 wherein said openings in said cell covers are formed along a straight line, at least one of said selectively removable wall portions extending parallel to said straight line and at least one other of said selectively removable wall portions extending perpendicular to said straight line.

3. A lead accumulator according to claim 1, wherein conductors are provided to interconnect like plates within the cell, said conductors being disposed below the upper edge of said cell covers.

4. A lead accumulator according to claim 1, wherein said cell connectors and conductors are embedded within a mass of insulating material.

5. A lead accumulator according to claim 1, wherein said cell connectors have an H-shaped configuration.

6. A lead accumulator according to claim 1, wherein said cell conductors have a T-shaped configuration.

7. A lead accumulator according to claim 1, wherein said cell connectors have a straight line configuration.

8. A lead accumulator according to claim 1, wherein each cell comprises double layer separators including a fine layer adjacent to said negative electrodes and a felt layer adjacent to said positive electrodes.

* * * * *